(12) United States Patent (10) Patent No.: US 8,537,264 B2
Ono (45) Date of Patent: Sep. 17, 2013

(54) IMAGE CAPTURING APPARATUS, METHOD, AND PROGRAM FOR PERFORMING AN AUTO FOCUS OPERATION USING INVISIBLE AND VISIBLE LIGHT

(75) Inventor: Hiroaki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 1004 days.

(21) Appl. No.: 12/110,770

(22) Filed: Apr. 28, 2008

(65) Prior Publication Data

US 2008/0273099 A1 Nov. 6, 2008

(30) Foreign Application Priority Data

May 1, 2007 (JP) ................. P2007-121206

(51) Int. Cl.
*G03B 13/00* (2006.01)
*H04N 5/232* (2006.01)

(52) U.S. Cl.
USPC ............ 348/345; 348/349; 348/335; 348/353

(58) Field of Classification Search
USPC .................................. 348/349, 335, 345, 353
See application file for complete search history.

(56) References Cited

U.S. PATENT DOCUMENTS

| | | | |
|---|---|---|---|
| 5,448,331 A | 9/1995 | Hamada et al. | |
| 6,319,199 B1 * | 11/2001 | Sheehan et al. | 600/200 |
| 6,614,998 B1 * | 9/2003 | Senba et al. | 396/123 |
| 7,847,854 B2 * | 12/2010 | Okawa et al. | 348/345 |
| 2002/0038076 A1 * | 3/2002 | Sheehan et al. | 600/200 |
| 2004/0036795 A1 * | 2/2004 | Fujii et al. | 348/349 |
| 2006/0152617 A1 * | 7/2006 | Konishi | 348/345 |
| 2007/0153099 A1 * | 7/2007 | Ohki et al. | 348/234 |
| 2007/0258708 A1 * | 11/2007 | Ide | 396/89 |
| 2008/0074530 A1 * | 3/2008 | Okawa et al. | 348/345 |
| 2008/0246950 A1 * | 10/2008 | Ono | 356/51 |
| 2008/0252773 A1 * | 10/2008 | Oishi | 348/347 |

FOREIGN PATENT DOCUMENTS

| | | |
|---|---|---|
| JP | 5-196859 | 8/1993 |
| JP | 10-013730 | 1/1998 |
| JP | 11-287946 | 10/1999 |
| JP | 3139067 | 12/2000 |
| JP | 2001-251648 | 9/2001 |
| JP | 2003-029138 | 1/2003 |
| JP | 2005-250401 | 9/2005 |
| JP | 2006-171147 | 6/2006 |

\* cited by examiner

*Primary Examiner* — Antoinette Spinks
(74) *Attorney, Agent, or Firm* — Finnegan, Henderson, Farabow, Garrett & Dunner, L.L.P.

(57) ABSTRACT

An image capturing apparatus includes an image pickup unit including an image pickup element that captures a plurality of colors in ranges of visible and invisible light incoming through an image capturing lens, a pixel value calculating unit that calculates a pixel value of each pixel regarding at least one of the captured colors, a contrast value calculating unit that calculates a contrast value for each color based on the calculated pixel values, a correction value calculating unit that calculates a focus correction value for a distance from a current position of the image capturing lens to a focus position based on a temporal change in the calculated contrast values of the at least one color, and an image capturing lens driving unit that drives the image capturing lens based on the calculated focus correction value.

12 Claims, 9 Drawing Sheets

FIG. 8
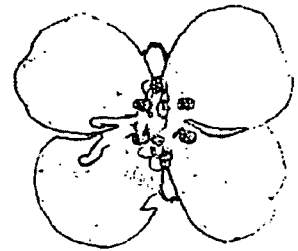
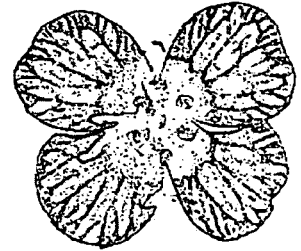
CAPTURED UNDER
VISIBLE LIGHT
CAPTURED UNDER
ULTRAVIOLET LIGHT

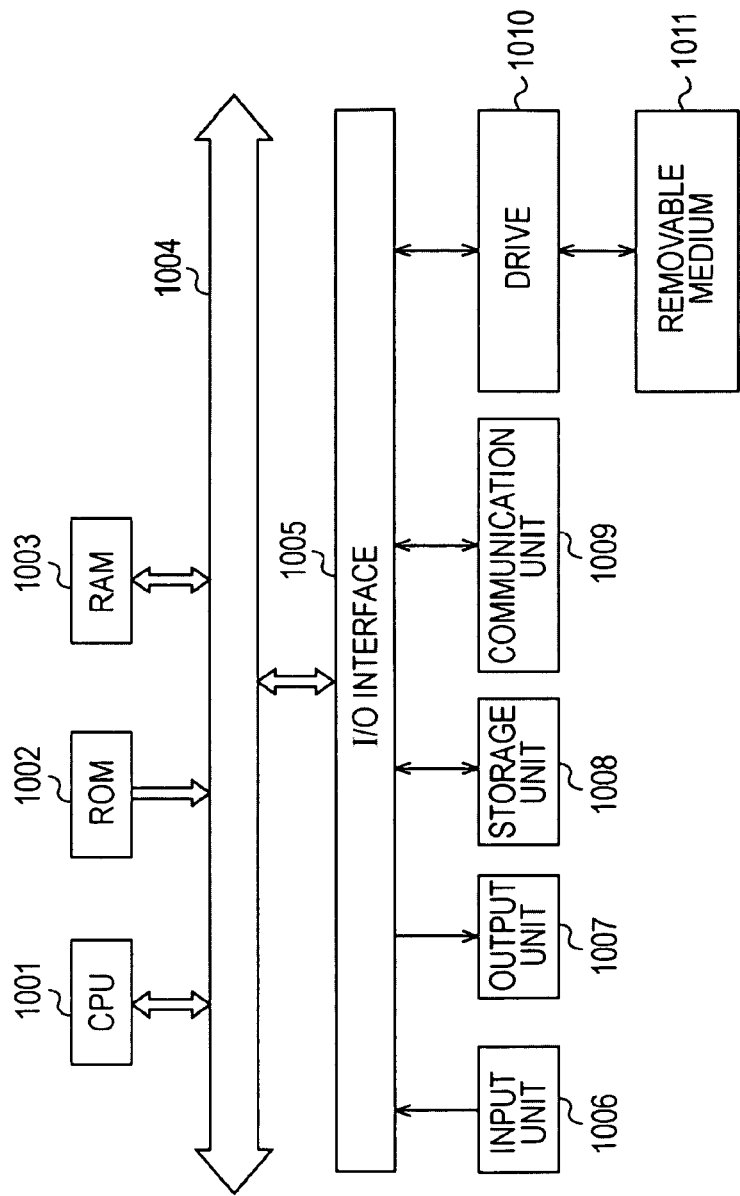

IMAGE CAPTURING APPARATUS, METHOD, AND PROGRAM FOR PERFORMING AN AUTO FOCUS OPERATION USING INVISIBLE AND VISIBLE LIGHT

CROSS REFERENCES TO RELATED APPLICATIONS

The present invention contains subject matter related to Japanese Patent Application JP 2007-121206 filed in the Japanese Patent Office on May 1, 2007, the entire contents of which are incorporated herein by reference.

BACKGROUND OF THE INVENTION

1. Field of the Invention

The present invention relates generally to image capturing apparatuses, image capturing methods, and programs.

More particularly, the present invention relates to an image capturing apparatus capable of performing an auto focus operation using invisible light in addition to visible light, an image capturing method, and a program.

2. Description of the Related Art

Recently, digital cameras or video cameras having an auto focus function for automatically adjusting the focus have been widely used.

A contrast detection method has been suggested as one of auto focusing methods. In the contrast detection method, contrast values are calculated on the basis of luminance values of image signals resulting from image capturing performed while moving an image capturing lens. A subject is determined to be in focus at a highest contrast value. The image capturing lens is driven to move to a position corresponding to the highest contrast value. Since a focused state is determined using captured image signals in an auto focus (AF) function according to such a contrast detection method (hereinafter, referred to as "contrast-detection-based AF function"), the accuracy of the focusing is high and is not affected by aging of mechanical devices. In addition, the contrast detection method advantageously reduces the cost since it does not require mechanical operations for focusing. However, in the contrast detection method, focusing of the lens on moving subjects is difficult since the method takes some time for focusing. Additionally, focusing of the lens on low-contrast subjects is also difficult.

Accordingly, single lens reflex (SLR) digital cameras, for which higher continuous shooting performance and higher moving subject focusing performance are required, employ an AF function according to a phase difference detection method (hereinafter, referred to as "phase-difference-detection-based AF function"). The phase difference detection method advantageously allows a focal point to be rapidly determined since a distance is directly measured. However, since the distance is measured with an apparatus independent from that for image capturing, the method requires another mechanical device for automatic focus detection, which undesirably increases the cost, causes the parallax, or decreases the focusing accuracy due to aging of the mechanical apparatus.

To overcome such disadvantages regarding the focusing time and the focusing accuracy, a hybrid AF function that utilizes both the phase-difference-detection-based and contrast-detection-based AF functions has been suggested. For example, the phase-difference-detection-based AF function is mainly used in a sport mode that requires higher continuous shooting performance and higher moving subject focusing performance, whereas the contrast-detection-based AF function is mainly used in a landscape mode and a macro mode. In addition, the focus is finely adjusted using the contrast-detection-based AF function after being roughly adjusted using the phase-difference-detection-based AF function.

Nevertheless, even in the hybrid AF method, a focusing capability undesirably decreases for low contrast subjects or under a low illumination environment. Accordingly, methods for irradiating auxiliary light onto a low-contrast subject or a subject under the low illumination environment to adjust the focus and detect a distance to the subject using the reflected light have been suggested. For example, a technique for irradiating strobe light as AF auxiliary light when the brightness is equal to or lower than a predetermined level has been suggested (see Japanese Patent No. 3139067). In addition, a technique for irradiating near-infrared light as AF auxiliary light has been suggested (Japanese Unexamined Patent Application Publication No. 05-196859).

SUMMARY OF THE INVENTION

Although an illumination level can be increased by auxiliary light in the aforementioned methods, it is difficult to focus a lens on a low-contrast subject in a wavelength range of the auxiliary light. As a result, focusing of the lens on the low-contrast subject may take some time or may not be achieved.

In view of such circumstances, the present invention allows a focusing operation to be performed highly accurately and robustly by performing the focusing operation on subjects, whose contrast is low under the visible light, using wavelengths in an invisible light range.

An image capturing apparatus according to one embodiment of the present invention includes image pickup means including an image pickup element configured to capture, in a unit of pixels, a plurality of colors in ranges of visible and invisible light incoming through an image capturing lens, pixel value calculating means configured to calculate a pixel value of each pixel regarding at least one of the colors captured by the image pickup means, contrast value calculating means configured to calculate a contrast value for each of the at least one color on the basis of the pixel values calculated by the pixel value calculating means, correction value calculating means configured to calculate a focus correction value for a distance from a current position of the image capturing lens to a focus position of the image capturing lens on the basis of a temporal change in the contrast values of the at least one color calculated by the contrast value calculating means, and image capturing lens driving means configured to drive the image capturing lens on the basis of the focus correction value calculated by the focus correction value calculating means.

The pixel value calculating means may calculate, for each pixel, a luminance value, including the visible light and the invisible light, as a pixel value. The contrast value calculating means may calculate the contrast value on the basis of the luminance values calculated by the pixel value calculating means. The focus correction value calculating means may calculate the focus correction value for the distance from the current position of the image capturing lens to the focus position of the image capturing lens on the basis of the temporal change in the contrast values calculated by the contrast value calculating means.

The pixel value calculating means may include visible light value calculating means configured to calculate, for each pixel, a luminance value of visible light as a visible light value, and invisible light value calculating means configured to calculate, for each pixel, a luminance value of invisible light as an invisible light value. The contrast value calculating means may include visible light contrast calculating means configured to calculate a visible light contrast value regarding the visible light values calculated by the visible light value calculating means, and invisible light contrast calculating means configured to calculate an invisible light contrast value regarding the invisible light values calculated by the invisible light value calculating means. The focus correction value calculating means may calculate the focus correction value for the distance from the current position of the image capturing lens to the focus position of the image capturing lens on the basis of the temporal change in the visible light contrast values and the invisible light contrast values.

The apparatus may further include visible light S/N ratio calculating means configured to calculate an S/N ratio of the visible light contrast value calculated by the visible light contrast value calculating means, and invisible light S/N ratio calculating means configured to calculate an S/N ratio of the invisible light contrast value calculated by the invisible light contrast value calculating means. The focus correction value calculating means may compare the S/N ratio of the visible light contrast value with the S/N ratio of the invisible light contrast value, select the contrast value having a larger S/N ratio as a contrast value suitable for calculation of the focus correction value, and calculate the focus correction value for the distance from the current position of the image capturing lens to the focus position of the image capturing lens on the basis of a temporal change in the contrast values suitable for calculation of the focus correction value.

The apparatus may further include contrast value combining means configured to combine the visible light contrast value and the invisible light contrast value to generate a combined contrast value. The focus correction value calculating means may calculate the focus correction value for the distance from the current position of the image capturing lens to the focus position of the image capturing lens on the basis of a temporal change in the combined contrast values.

The contrast value combining means may combine the visible light contrast value and the invisible light contrast value at a combination ratio based on both of the contrast values to generate the combined contrast value. The focus correction value calculating means may calculate, according to the combination ratio, the focus correction value for the distance from the current position of the image capturing lens to the focus position of the image capturing lens on the basis of the temporal change in the combined contrast values.

The pixel value calculating means may calculate, for each pixel, a luminance value of infrared light and a luminance value of ultraviolet light as an infrared light value and an ultraviolet light value, respectively. The contrast value calculating means may calculate a contrast value for each of the visible light values, the infrared light values, and the ultraviolet light values calculated by the pixel value calculating means. The focus correction value calculating means may calculate the focus correction value for the distance from the current position of the image capturing lens to the focus position of the image capturing lens on the basis of temporal changes in the contrast values of the visible light values, the infrared light values, and the ultraviolet light values calculated by the contrast value calculating means.

The apparatus may further include auxiliary light irradiating means configured to irradiate light of a color, in the visible and invisible light ranges, suitable for calculation of the contrast value onto a subject, and auxiliary light irradiation control means configured to control irradiation of auxiliary light performed by the auxiliary light irradiating means.

The auxiliary light irradiation control means may control the auxiliary light irradiating means to irradiate light, selected from the visible light, the infrared light, and the ultraviolet light, suitable for calculation of the contrast value onto a subject.

An image capturing method according to another embodiment of the present invention includes the steps of capturing, in a unit of pixels, a plurality of colors in ranges of visible and invisible light incoming through an image capturing lens, calculating a pixel value of each pixel regarding at least one of the captured colors, calculating, for each of the at least one color, a contrast value on the basis of the calculated pixel values of the corresponding color, calculating a focus correction value for a distance from a current position of the image capturing lens to a focus position of the image capturing lens on the basis of a temporal change in the calculated contrast values of the at least one color, and driving the image capturing lens on the basis of the calculated focus correction value.

A program according to another embodiment of the present invention allows a computer to execute a method including the steps of capturing, in a unit of pixels, a plurality of colors in ranges of visible and invisible light incoming through an image capturing lens, calculating a pixel value of each pixel regarding at least one of the captured colors, calculating, for each of the at least one color, a contrast value on the basis of the calculated pixel values of the corresponding color, calculating a focus correction value for a distance from a current position of the image capturing lens to a focus position of the image capturing lens on the basis of a temporal change in the calculated contrast values of the at least one color, and driving the image capturing lens on the basis of the calculated focus correction value.

A program-storing medium according to still another embodiment of the present invention can record the program according to the foregoing embodiment.

In the image capturing apparatus, the image capturing method, and the program according to the embodiments of the present invention, a plurality of colors in ranges of visible and invisible light incoming through an image capturing lens are captured by each pixel. Pixel values for at least one of the captured colors are calculated. A contrast value is calculated for each of the at least one color is calculated on the basis of the calculated pixel values of the colors. A focus correction value for a distance between a current position and a focus position of the image capturing lens is calculated on the basis of a temporal change in the calculated contrast values of the at least one color. The image capturing lens is driven on the basis of the calculated focus correction value.

An image capturing apparatus according to an embodiment of the present invention may be an independent apparatus or a block performing an image capturing operation.

According to one embodiment of the present invention, a focusing operation can be performed highly accurately and robustly even on a low-contrast subject.

BRIEF DESCRIPTION OF THE DRAWINGS

FIG. 8 is a diagram showing example images captured under visible light and ultraviolet light; and FIG. 9 is a diagram illustrating an example of a configuration of a personal computer.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 1:
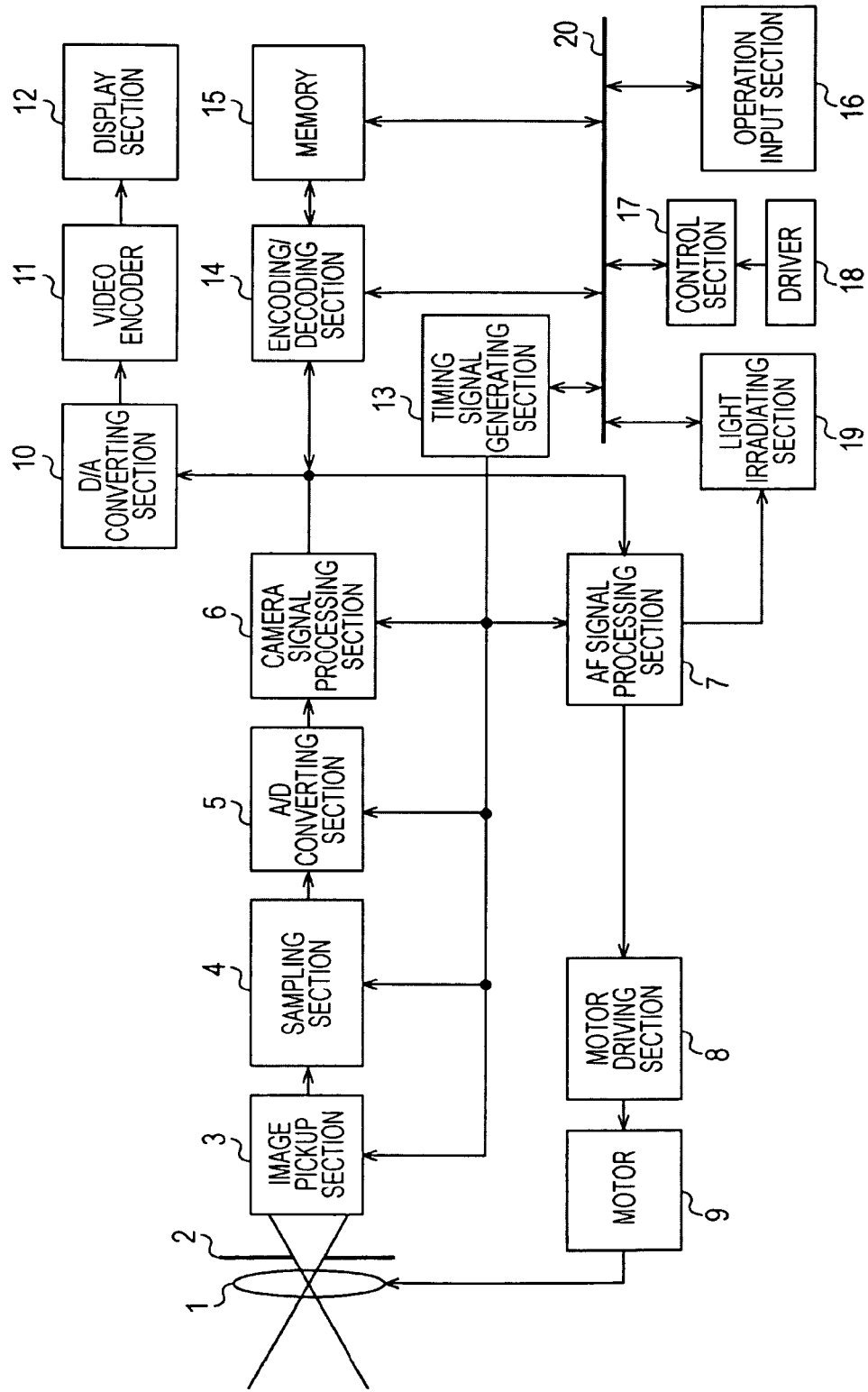
FIG. 1 is a block diagram illustrating an example of a configuration of a digital still camera employing an embodiment of the present invention.
Figure 2:
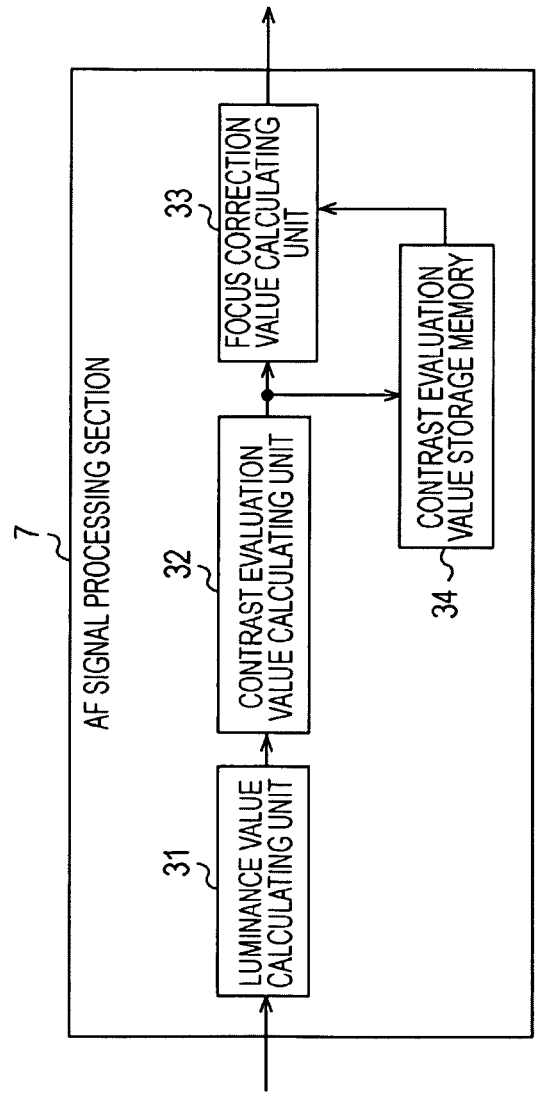
FIG. 2 is a block diagram illustrating an example of a configuration of an AF signal processing section shown in FIG. 1.

More specifically, an image capturing apparatus (e.g., an image capturing apparatus shown in FIG. 1) according to one embodiment of the present invention includes image pickup means (e.g., an image pickup section 3 shown in FIG. 1) including an image pickup element configured to capture, in a unit of pixels, a plurality of colors in ranges of visible and invisible light incoming through an image capturing lens, pixel value calculating means (e.g., a luminance value calculating unit 31 shown in FIG. 2) configured to calculate a pixel value of each pixel regarding at least one of the colors captured by the image pickup means, contrast value calculating means (e.g., a contrast evaluation value calculating unit 32 shown in FIG. 2) configured to calculate a contrast value for each of the at least one color on the basis of the pixel values calculated by the pixel value calculating means, correction value calculating means (e.g., a focus correction value calculating unit 33 shown in FIG. 2) configured to calculate a focus correction value for a distance from a current position of the image capturing lens to a focus position of the image capturing lens on the basis of a temporal change in the contrast values of the at least one color calculated by the contrast value calculating means, and image capturing lens driving means (e.g., a motor driving section 8 shown in FIG. 1) configured to drive the image capturing lens on the basis of the focus correction value calculated by the focus correction value calculating means.

The pixel value calculating means (e.g., the luminance value calculating unit 31 shown in FIG. 2) may calculate, for each pixel, a luminance value, including the visible light and the invisible light, as a pixel value. The contrast value calculating means (e.g., the contrast evaluation value calculating unit 32 shown in FIG. 2) may calculate the contrast value on the basis of the luminance values calculated by the pixel value calculating means. The focus correction value calculating means (e.g., the focus correction value calculating unit 33 shown in FIG. 2) may calculate the focus correction value for the distance from the current position of the image capturing lens to the focus position of the image capturing lens on the basis of the temporal change in the contrast values calculated by the contrast value calculating means.

The pixel value calculating means may include visible light value calculating means (e.g., a visible light value calculating unit 41 shown in FIG. 4 or a visible light value calculating unit 51 shown in FIG. 6) configured to calculate, for each pixel, a luminance value of visible light as a visible light value, and invisible light value calculating means (e.g., an invisible light value calculating unit 43 shown in FIG. 4 or an invisible light value calculating unit 53 shown in FIG. 6) configured to calculate, for each pixel, a luminance value of invisible light as an invisible light value. The contrast value calculating means may include visible light contrast calculating means (e.g., a contrast evaluation value calculating unit 42 shown in FIG. 4 or a contrast evaluation value calculating unit 52 shown in FIG. 6) configured to calculate a visible light contrast value regarding the visible light values calculated by the visible light value calculating means, and invisible light contrast calculating means (e.g., a contrast evaluation value calculating unit 44 shown in FIG. 4 or a contrast evaluation value calculating unit 54 shown in FIG. 6) configured to calculate an invisible light contrast value regarding the invisible light values calculated by the invisible light value calculating means. The focus correction value calculating means (e.g., a focus correction value calculating unit 46 shown in FIG. 4 or a focus correction value calculating unit 55 shown in FIG. 6) may calculate the focus correction value for the distance from the current position of the image capturing lens to the focus position of the image capturing lens on the basis of the temporal change in the visible light contrast values and the invisible light contrast values.

The apparatus may further include visible light S/N ratio calculating means (e.g., an S/N ratio calculator 52a shown in FIG. 6) configured to calculate an S/N ratio of the visible light contrast value calculated by the visible light contrast value calculating means, and invisible light SIN ratio calculating means (e.g., an S/N ratio calculator 54a shown in FIG. 6) configured to calculate an S/N ratio of the invisible light contrast value calculated by the invisible light contrast value calculating means. The focus correction value calculating means (e.g., the focus correction value calculating unit 55 shown in FIG. 6) may compare the S/N ratio of the visible light contrast value with the S/N ratio of the invisible light contrast value, select the contrast value having a larger S/N ratio as a contrast value suitable for calculation of the focus correction value, and calculate the focus correction value for the distance from the current position of the image capturing lens to the focus position of the image capturing lens on the basis of a temporal change in the contrast values suitable for calculation of the focus correction value.

Figure 4:
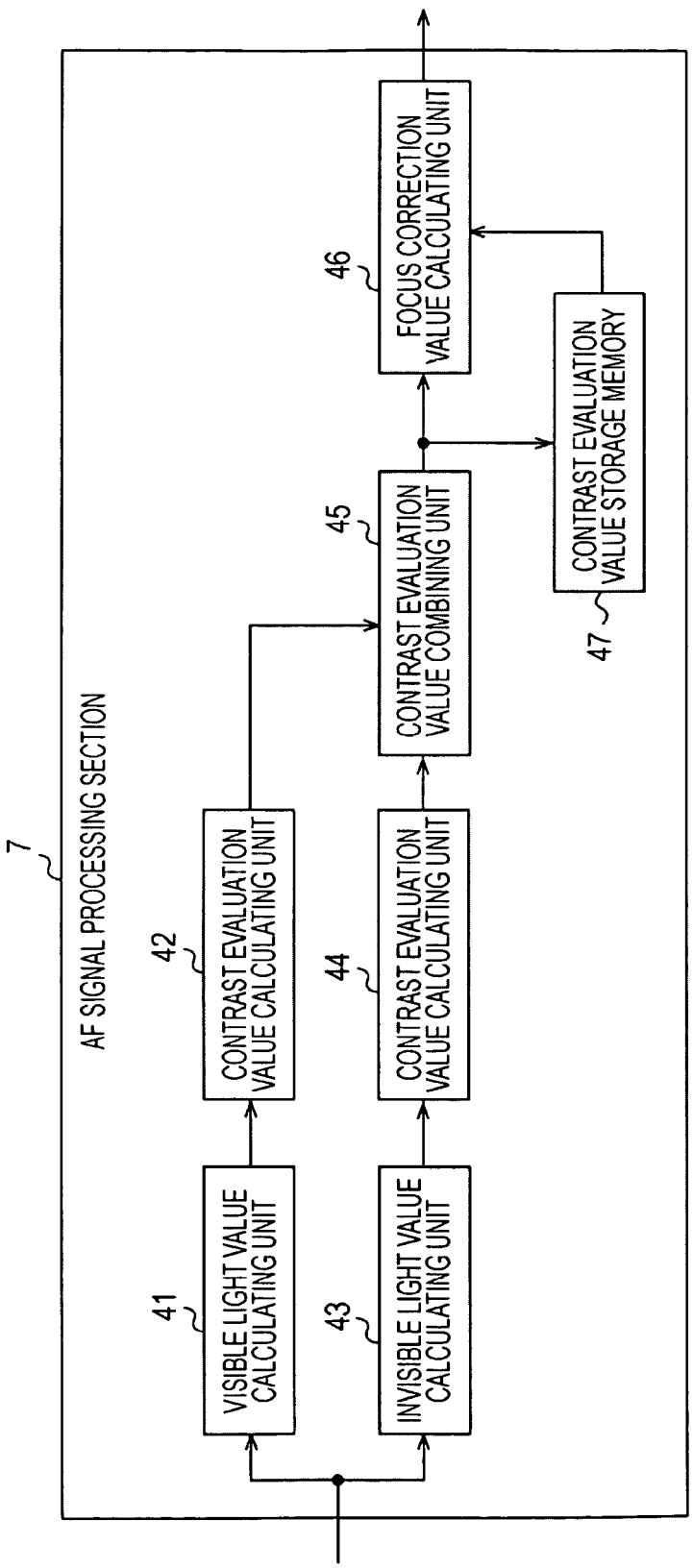
FIG. 4 is a block diagram illustrating another example of a configuration of an AF signal processing unit shown in FIG. 1.

The apparatus may further include contrast value combining means (e.g., a contrast evaluation value combining unit 45 shown in FIG. 4) configured to combine the visible light contrast value and the invisible light contrast value to generate a combined contrast value. The focus correction value calculating means may calculate the focus correction value for the distance from the current position of the image capturing lens to the focus position of the image capturing lens on the basis of a temporal change in the combined contrast values.

The contrast value combining means (e.g., the contrast evaluation value combining unit 45 shown in FIG. 4) may combine the visible light contrast value and the invisible light contrast value at a combination ratio based on both of the contrast values to generate the combined contrast value. The focus correction value calculating means may calculate, according to the combination ratio, the focus correction value for the distance from the current position of the image capturing lens to the focus position of the image capturing lens on the basis of the temporal change in the combined contrast values.

The pixel value calculating means (e.g., the luminance value calculating unit 31 shown in FIG. 2) may calculate, for each pixel, a luminance value of infrared light and a luminance value of ultraviolet light as an infrared light value and an ultraviolet light value, respectively. The contrast value calculating means (e.g., the contrast evaluation value calculating unit 32 shown in FIG. 2) may calculate a contrast value for each of the visible light values, the infrared light values, and the ultraviolet light values calculated by the pixel value calculating means. The focus correction value calculating means (e.g., the focus correction value calculating unit 33 shown in FIG. 2) may calculate the focus correction value for the distance from the current position of the image capturing lens to the focus position of the image capturing lens on the basis of temporal changes in the contrast values of the visible light values, the infrared light values, and the ultraviolet light values calculated by the contrast value calculating means.

Figure 6:
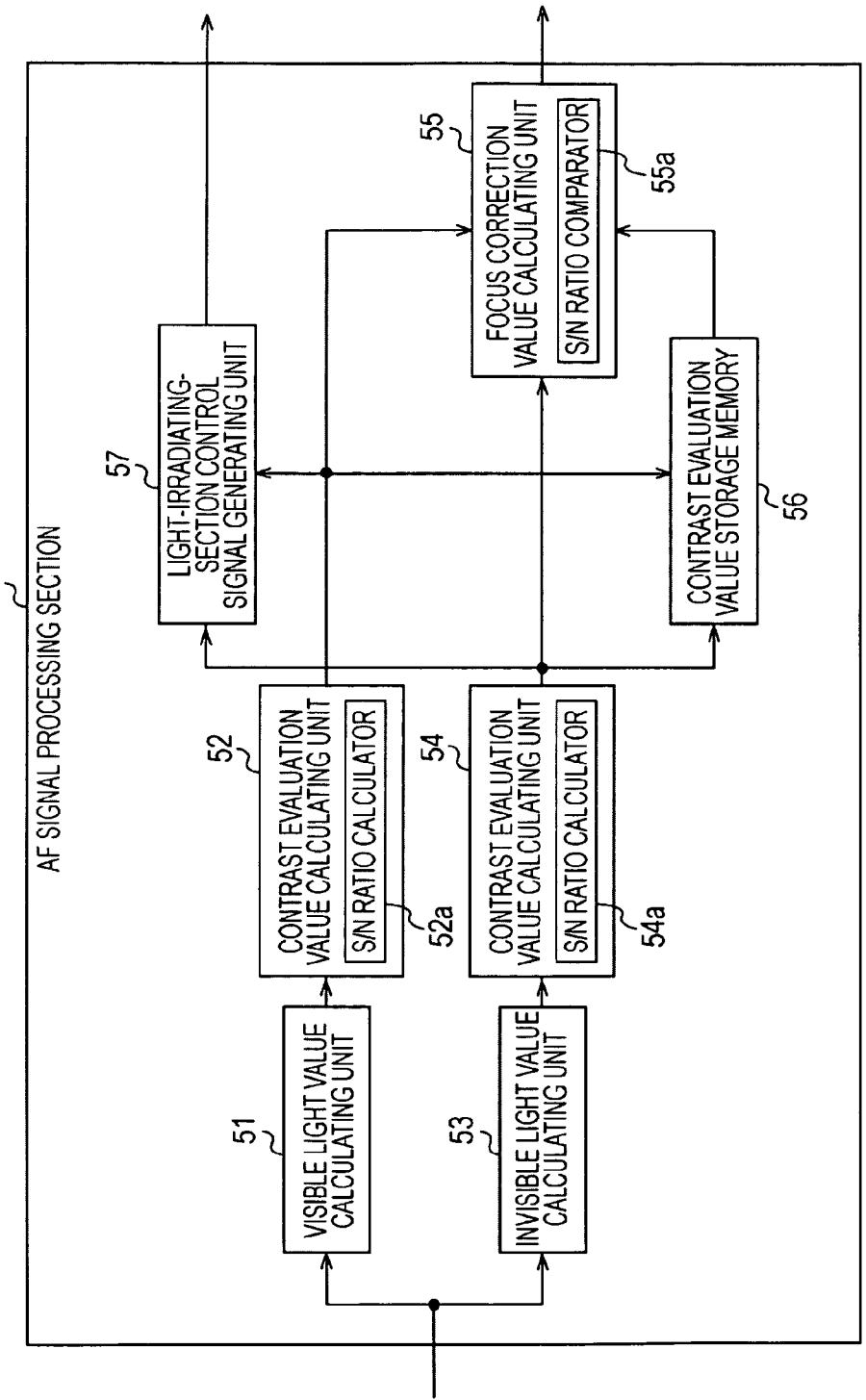
FIG. 6 is a block diagram illustrating still another example of a configuration of an AF signal processing unit shown in FIG. 1.

The apparatus may further include auxiliary light irradiating means (e.g., a light irradiating section 19 shown in FIG. 1) configured to irradiate light of a color, in the visible and invisible light ranges, suitable for calculation of the contrast value onto a subject, and auxiliary light irradiation control means (e.g., a light-irradiating-section control signal generating unit 57 shown in FIG. 6) configured to control irradiation of auxiliary light performed by the auxiliary light irradiating means.

The auxiliary light irradiation control means (e.g., the light-irradiating-section control signal generating unit 57 shown in FIG. 6) may control the auxiliary light irradiating means to irradiate light, selected from the visible light, the infrared light, and the ultraviolet light, suitable for calculation of the contrast value onto a subject.

Figure 3:
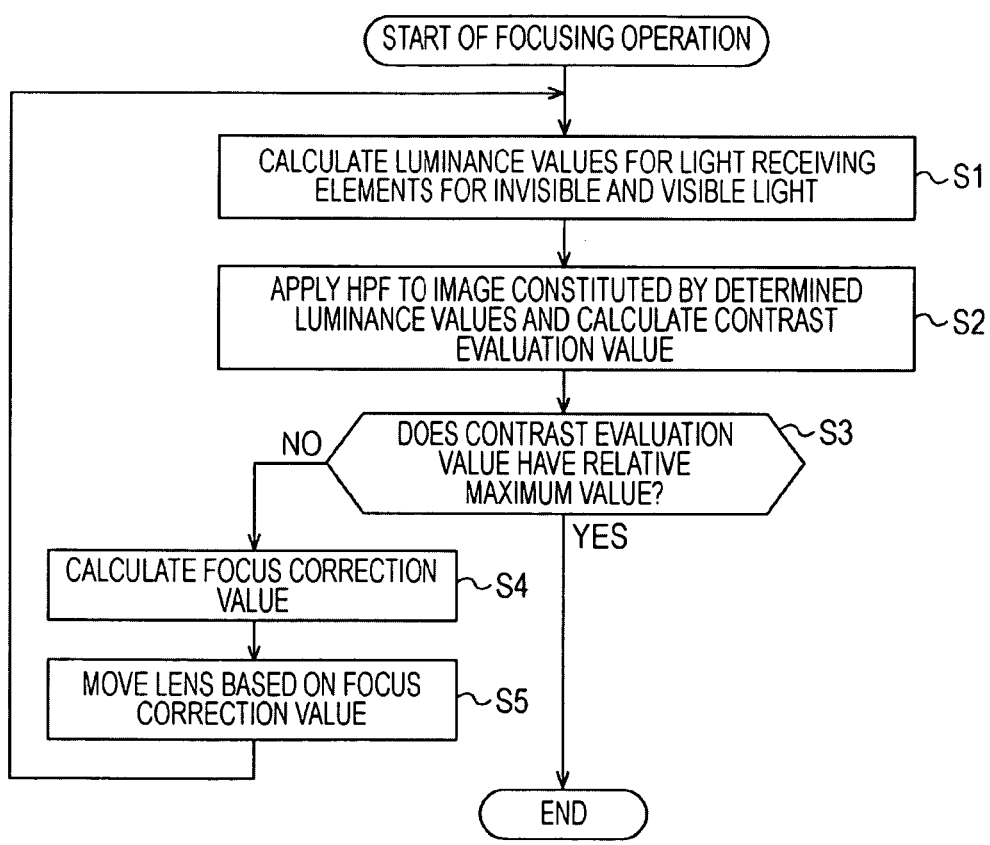
FIG. 3 is a flowchart describing a focusing operation of an AF signal processing section shown in FIG. 2.

An image capturing method according to another embodiment of the present invention includes the steps of capturing, in a unit of pixels, a plurality of colors in ranges of visible and invisible light incoming through an image capturing lens (e.g., STEP S1 shown in FIG. 3), calculating a pixel value of each pixel regarding at least one of the captured colors (e.g., STEP S1 shown in FIG. 3), calculating, for each of the at least one color, a contrast value on the basis of the calculated pixel values of the corresponding color (e.g., STEP S2 shown in FIG. 3), calculating a focus correction value for a distance from a current position of the image capturing lens to a focus position of the image capturing lens on the basis of a temporal change in the calculated contrast values of the at least one color (e.g., STEP S4 shown in FIG. 3), and driving the image capturing lens on the basis of the calculated focus correction value (e.g., STEP S5 shown in FIG. 3).

FIG. 1 is a block diagram illustrating a digital still camera that employs an embodiment of the present invention.

As shown in FIG. 1, the digital still camera includes a lens 1, an aperture stop 2, an image pickup section 3, a sampling (correlated double sampling: CDS) section 4, an analog/digital (A/D) converting section 5, a camera signal processing section 6, an auto focus (AF) signal processing section 7, a motor driving section 8, a motor 9, a digital/analog (D/A) converting section 10, a video encoder 11, a display section 12, a timing signal generating section 13, an encoding/decoding section 14, a memory 15, an operation input section 16, a control section 17, a driver 18, a light irradiating section 19, and a bus 20.

The image pickup section 3 includes a (photoelectric converting) semiconductor element, such as a charge coupled device (CCD) image sensor or a complementary metal oxide semiconductor (CMOS) image sensor, for converting light information into electric signals. A plurality of light-receiving elements (pixels) for converting the light into electric signals is arranged in the image pickup section 3. Each of the pixels independently converts a change in the light into an electric signal and outputs the electric signal to the sampling section 4.

Since the image pickup section 3 has sensitivity to visible and invisible (ultraviolet and infrared) light ranges, most image capturing apparatuses have a filter or the like for eliminating the wavelengths of the invisible light provided on the upstream side of the image pickup section 3 to capture only wavelengths (R, G, and B) of the visible light range.

However, the image pickup section 3 shown in FIG. 1 is capable of capturing wavelengths of the invisible light range as well as the visible light range. The image pickup section 3 utilizes, as in the case of the related art, the visible light (R, G, and B) during recording and utilizes information of the visible and invisible (infrared and ultraviolet) ranges while repeating a focusing operation.

Any given method is employable as a method for simultaneously capturing visible and invisible light. For example, a method for realizing the simultaneous capturing of the visible and invisible light with a single image sensor, i.e., a method for spatially arranging visible light capturing pixels and invisible light capturing pixels in one sensor, a method for dividing incident light into a plurality of wavelength ranges with a prism and receiving the light with a plurality of image sensors, or a method for performing time-division image capturing using a plurality of filters for passing different wavelengths is employable. Referring back to FIG. 1, the description is given for a case where visible light capturing pixels and invisible light capturing pixels are spatially arranged in a sensor of the image pickup section 3.

The sampling section 4 eliminates a reset noise, which is a main noise component included in output signals of the image pickup section 3, by subtracting an output signal from each pixel sampled during a reference period from the output signal sampled during a video signal period. The sampling section 4 then outputs the noise-eliminated signals to the A/D converting section 5.

The A/D converting section 5 converts the supplied noise-eliminated analog signals into digital signals and outputs the digital signals to the camera signal processing section 6.

The camera signal processing section 6 has a signal processor and a random access memory (RAM) for storing images (hereinafter, referred to as "image RAM"). The signal processor performs programmed image processing or arithmetic image processing realized by hardware on image data stored in the image RAM.

In a focusing operation, the AF signal processing section 7 detects, using a so-called contrast detection method, a focus position on the basis of each pixel value of an image processed by the camera signal processing unit 6, determines a position of the lens 1 by calculation, controls the motor driving section 8 to drive the motor 9 and move the lens 1 to the focus position. The AF signal processing section 7 also controls operations of the light irradiating section 19 to irradiate auxiliary light including visible or invisible light onto a subject during the focusing operation performed under a low-illumination environment. The AF signal processing section 7 will be described in detail with reference to FIG. 2.

The D/A converting section 10 converts the digital image signals supplied from the camera signal processing section 6 into analog signals and outputs the analog signals to the video encoder 11. The video encoder 11 encodes the supplied analog image signals into video data in a format displayable by the display section 12. The display section 12 includes, for example, a liquid crystal display (LCD) and displays images corresponding to the video signals supplied from the video encoder 11.

The timing signal generating section 13 is a logic circuit for generating, in synchronization with a reference clock, horizontal and vertical driving pulses and a pulse used in analog-front processing. A timing clock generated by the timing signal generating section 13 is supplied to the encoding/decoding section 14, the memory 15, the control section 17, and the light irradiating section 19 though the bus 20.

The encoding/decoding section 14 executes processing based on a digital image data compression or decompression algorithm, such as, for example, JPEG (Joint Picture Experts Group) formats. The memory 15 is constituted by, for example, a semiconductor memory, a magnetic disc, a magneto-optical disc, or an optical disc. The memory 15 stores supplied data or outputs stored data under the control of the control section 17. The memory 15 may be removable from a main body of the digital still camera.

The operation input section 16 includes, for example, a recording-instruction button, a jog dial, keys, a lever, buttons, or a touch panel. The operation input section 16 receives user input operations.

The control section 17 controls each section of the digital still camera on the basis of signals corresponding to the user input operations supplied from the operation input section 16. The control section 17 downloads and uses programs and data recorded on an external storage medium, such as a semiconductor memory, a magnetic disc, a magneto-optical disc, or an optical disc, connected to the driver 18.

The light irradiating section 19 irradiates auxiliary light including visible or invisible light onto a subject when the illumination level is low.

An operation of the digital still camera illustrated in FIG. 1 will now be described.

Light having passed through the lens 1 and the aperture stop 2 goes into the image pickup section 3 and is converted into electric signals by the light-receiving elements included in the image pickup section 3. The electric signals are then supplied to the sampling section 4. After eliminating noises by subtracting each of output pixel signals of the image pickup section 3 sampled during a reference period from the pixel signal sampled during a video signal period, the sampling section 4 supplies the noise-eliminated signals to the A/D converting section 5. The A/D converting section 5 converts the supplied noise-eliminated analog signals into digital signals and temporarily stores the signals in the image RAM of the camera signal processing section 6.

The timing signal generating section 13 controls readout of image signals performed by the image pickup section 3 on the basis of an image capturing state, such as a state indicating whether a shutter button is pressed. The timing signal generating section 13 also controls the image pickup section 3, the sampling section 4, the A/D converting section 5, and the camera signal processing section 6 to maintain an image capturing frame rate at a constant level.

The camera signal processing section 6 is supplied with stream pixel data at a constant rate and temporarily stores the data in the image RAM. The signal processor of the camera signal processing section 6 executes image processing, which will be described later, on the temporarily stored image data. After the completion of the image processing, the camera signal processing section 6 supplies, under the control of the control section 17, the image data to the D/A converting section 10 to display images corresponding to the image data on the display section 12 or to the encoding/decoding section 14 to store the image data in the memory 15.

The D/A converting section 10 converts the digital image data supplied from the camera signal processing section 6 into analog signals and supplies the analog signals to the video encoder 11. The video encoder 11 converts the supplied analog image signals into video signals and outputs the video signals to the display section 12 to display corresponding images. That is, the display section 12 serves as a view finder of the digital still camera. After encoding the image data supplied from the camera signal processing section 6 according to a predetermined encoding method, the encoding/decoding section 14 supplies the encoded image data to the memory 15 to store the data therein.

The AF signal processing section 7 calculates information necessary for focusing of the lens 1 on the basis of the image signals stored in the image RAM included in the camera signal processing section 6. The motor driving section 8 supplies the motor 9 with a driving signal corresponding to a correction value for moving the lens 1 from the original position of lens 1 to a focus correction position of the lens 1 determined on the basis of the information calculated by the AF signal processing section 7. The motor 9, in turn, drives the lens 1 using the driving signal supplied from the motor driving section 8.

More specifically, the focusing operation is repeatedly performed in a general state. In addition, the AF signal processing section 7 controls the light irradiating section 19 to irradiate auxiliary light onto a subject when the information necessary for focusing cannot be calculated because the environment illumination level is low or the contrast of the subject is low.

Under the control of the control section 17 having received a signal corresponding to a user input operation from the operation input section 16, the encoding/decoding section 14 reads out data specified by the user from the data stored in the memory 15, decodes the data according to a predetermined decoding method, and outputs the decoded signals to the camera signal processing section 6. The decoded signals are then supplied to the D/A converting section 10 through the camera signal processing section 6 and are converted into analog signals. The analog signals are then encoded by the video encoder 11 and corresponding images are displayed on the display section 12.

More specifically, in a general state (a state before the shutter button is pressed), thinned-out image signals are continuously written in the image RAM of the camera signal processing section 6 from the image pickup section 3 at a constant frame rate under the control of the timing signal generating section 13. The image signals processed by the camera signal processing section 6 are supplied to the D/A converting section 10 and are converted into analog signals. The analog signals are then converted into video signals by the video encoder 11 and images corresponding to the converted video signals are displayed on the display section 12. Since the images displayed at this time correspond to the thinned-out image signals, the resolution of the images is lower than that of the image pickup section 3. In this state, the display section 12 serves as a view finder of the image pickup section 3.

In response to a user's half-pressing (half-pushing) of a shutter button included in the operation input section 16, the control section 17 causes the AF signal processing section 7 to adjust a focus position of the lens 1 using the contrast detection method.

In response to a user's pressing of the shutter button included in the operation input section 16, the control section 17 causes, on the basis of the timing at which the shutter button is pressed, the timing signal generating section 13 to control the image pickup section 3 so that all of pixel signals are read out from the image pickup section 3. The control section 17 also controls the timing signal generating unit 13 so that new image data is not written in the image RAM of the camera signal processing section 6 for a predetermined period, i.e., so that the read out image signals are processed and held therein. The image signals processed by the camera signal processing section 6 are encoded by the encoding/decoding section 14 according to a predetermined method and are stored in the memory 15.

An example of a configuration of the AF signal processing section 7 shown in FIG. 1 according to an embodiment will now be described with reference to FIG. 2.

A luminance value calculating unit 31 calculates a luminance value from each pixel value and outputs the calculation result to a contrast evaluation value calculating unit 32. Here, the luminance value is calculated by taking a visible light range and an invisible light range into account.

The contrast evaluation value calculating unit 32 applies, for example, a high-pass filter to the luminance value of each pixel of the input luminance image to extract high-frequency components as a contrast value. The contrast evaluation value calculating unit 32 integrates the extracted contrast value and outputs the integrated value to a focus correction value calculating unit 33 and a contrast evaluation value storage memory 34 as the contrast evaluation value for each image.

The contrast evaluation value storage memory 34 stores a plurality of contrast evaluation values, calculated by the contrast evaluation value calculating unit 32 for each image sequentially input to the AF signal processing section 7, in association with positions of the lens 1.

Based on the contrast evaluation value of the current input image calculated by the contrast evaluation value calculating unit 32, the plurality of contrast evaluation values calculated for each preceding image and stored in the contrast evaluation value storage memory 34, and the corresponding positions of the lens 1, the focus correction value calculating unit 33 estimates a focus position that gives a relative maximum contrast evaluation value indicating a focused state. The focus correction value calculating unit 33 calculates a distance from the current position of the lens 1 to the focus position as a focus correction value.

The motor driving section 8 drives the motor 9 by a driving amount corresponding to the focus correction value to moves the lens 1 to the estimated focus position.

A focusing operation performed by the digital still camera shown in FIG. 1 including the AF signal processing section 7 shown in FIG. 2 will now be described with reference to a flowchart shown in FIG. 3.

At STEP S1, the camera signal processing section 6 generates, for each pixel, an image signal including information of visible and invisible light ranges on the basis of image data supplied thereto through the lens 1, the aperture stop 2, the image pickup section 3, the sampling section 4, and the A/D converting section 5. The camera signal processing section 6 supplies the image signals to the AF signal processing section 7. Upon receiving the image signals for one frame, the luminance value calculating unit 31 of the AF signal processing section 7 calculates a luminance value of each pixel value on the basis of the image signals supplied thereto from the camera signal processing section 6 and outputs the calculation result to the contrast evaluation value calculating unit 32.

At STEP S2, the contrast evaluation value calculating unit 32 applies, for example, a high-pass filter to the luminance value of each pixel of the input luminance image to extract high-frequency components as a contrast value. The contrast evaluation value calculating unit 32 integrates the extracted contrast value to calculate a contrast evaluation value and outputs the calculated contrast evaluation value to the focus correction value calculating unit 33 and the contrast evaluation value storage memory 34.

At STEP S3, the focus correction value calculating unit 33 determines whether the contrast evaluation values have a relative maximum value on the basis of the contrast evaluation value of the image input at the current time T calculated by the contrast evaluation value calculating unit 32, the plurality of contrast evaluation values calculated for each image before the current time T and stored in the contrast evaluation value storage memory 34, and the corresponding positions of the lens 1.

More specifically, the focus correction value calculating unit 33 uses, for example, the horizontal axis to represent positions of the lens 1 from the aperture stop 2 at the time when the contrast evaluation values are calculated and the vertical axis to represent the contrast evaluation values at the corresponding times. The focus correction value calculating unit 33 analyzes a temporal change in the contrast evaluation values corresponding to a change in positions of the lens 1 from the aperture stop 2 at and before the current time T and determines whether the contrast evaluation value indicates a relative maximum value at the current position of lens 1 from the aperture stop 2 at the current time T.

For example, upon determining that contrast evaluation value at the current time T is not the relative maximum value at STEP S3, the focus correction value calculating unit 33 calculates a focus correction value and outputs the correction value to the motor driving section 8 as an AF signal at STEP S4. More specifically, the focus correction value calculating unit 33 estimates a focus position of the lens 1 from the aperture stop 2 that gives the relative maximum contrast evaluation value on the basis of the result of analyzing a temporal change in the contrast evaluation values corresponding to the change in the positions of the lens 1 from the aperture stop 2 at and before the current time T. The focus correction value calculating unit 33 calculates a distance from the current position of the lens 1 to the estimated focus position as a focus correction value.

At STEP S5, the motor driving section 8 drives the motor 9 on the basis of the focus correction value included in the AF signal supplied thereto from the AF signal processing section 7 to move the lens 1. The process then returns to STEP S1.

More specifically, at least three contrast evaluation values are needed to allow the contrast evaluation values to have a relative maximum value. For example, when the number of the contrast values is one, i.e., when only the contrast evaluation value at the current time T exists and the contrast evaluation value storage memory 34 stores no other contrast evaluation values, the lens 1 is moved to a position different from the current position in order to increase the number of the sampled contrast evaluation values. Thus, at this time, a predetermined value is set as a dummy focus correction value and a real focus correction value is not calculated.

When two or more contrast evaluation values linearly increase or decrease without having a relative maximum value, the focus correction value calculating unit 33 sets, as the focus correction value for driving the lens 1, a distance between the current position of the lens 1 and a position that is away from the position of the lens 1 corresponding to a maximum value of the existing contrast evaluation values by a predetermined distance in a direction from the current position of lens 1 toward the position corresponding to the maximum value. For example, when two contrast evaluation values exist and a contrast evaluation value E1 obtained when the lens 1 is located at a position P1 farther from the aperture stop 2 is higher than a contrast evaluation value E2 obtained when the lens 1 is located at a position P2 closer to the aperture stop 2, the contrast evaluation value linearly increases as the lens 1 moves in a direction away from the aperture stop 2. In such a case, the focus correction value calculating unit 33 calculates a focus correction value so that the lens 1 is moved to a position away from the position P1 by a predetermined distance from the aperture stop 2.

When three or more contrast evaluation values exist and a relative maximum contrast evaluation value exists near the middle of positions of the lens 1 nearest and farthest from the aperture stop 2, the focus correction value calculating unit 33 determines a position of the lens 1 that gives the relative maximum contrast evaluation value through, for example, interpolation using the contrast evaluation value corresponding to the middle position and calculates a difference between the determined position and the current position as the focus correction value.

Processing at STEPs S1 to S5 is repeated until the current contrast evaluation value is determined to be the relative maximum value at STEP S3. When the current contrast evaluation value is determined to be the relative maximum value, it is assumed that the lens 1 is set to the focus position and the focusing operation is terminated.

In the related art, the contrast evaluation values are calculated using only luminance information of the visible light range. However, in the above-described operation, the use of luminance information including information of the invisible light range allows contrast information to be utilized effectively when the contrast of the subject is low in the visible light range but is high in the invisible light range. As a result, a focusing operation can be performed more accurately than in the related art.

Although an example where contrast evaluation values are calculated using both visible and invisible light has been described above, contrast evaluation values for visible light and for invisible light may be separately determined, combined, and treated as a combined contrast evaluation value. A focusing operation may be then performed using the combined contrast evaluation value.

Another example of a configuration of the AF signal processing section 7 of the digital still camera that performs a focusing operation using the combined contrast evaluation values will now be described with reference to FIG. 4 in accordance with an embodiment of the present invention.

A visible light value calculating unit 41 calculates, as a visible light value, a visible light luminance value from each pixel value using information of captured wavelengths in the visible light range. The visible light value calculating unit 41 outputs the result to a contrast evaluation value calculating unit 42.

The contrast evaluation value calculating unit 42 applies, for example, a high-pass filter to the visible light value of each pixel of the input luminance image to extract high-frequency components as a contrast value. The contrast evaluation value calculating unit 42 integrates the extracted contrast value to calculate a contrast evaluation value of the visible light values (hereinafter, referred to as visible light contrast evaluation value) and outputs the result to a contrast evaluation value combining unit 45.

An invisible light value calculating unit 43 calculates, as an invisible light value, an invisible light luminance value from each pixel value using information of captured wavelengths in the invisible light range. The invisible light value calculating unit 43 outputs the result to a contrast evaluation value calculating unit 44.

The contrast evaluation value calculating unit 44 applies, for example, a high-pass filter to the invisible light value of each pixel of the input luminance image to extract high-frequency components as a contrast value. The contrast evaluation value calculating unit 44 integrates the extracted contrast value to calculate a contrast evaluation value of the invisible light values (hereinafter, referred to as invisible light contrast evaluation value) and outputs the result to the contrast evaluation value combining unit 45.

The contrast evaluation value combining unit 45 combines the visible light contrast evaluation value and the invisible light contrast evaluation value to make evaluation of the contrast easier. The contrast evaluation value combining unit 45 outputs the combined contrast evaluation value to a focus correction value calculating unit 46 and a contrast evaluation value storage memory 47 along with a combination ratio.

Based on the combined contrast evaluation value of an image input at a current time T calculated by the contrast evaluation value combining unit 45, a plurality of combined contrast evaluation values calculated for each image before the current time T and stored in the contrast evaluation value storage memory 47, and the corresponding combination ratios, the focus correction value calculating unit 46 estimates a focus position that gives a relative maximum value of the combined contrast evaluation values. The focus correction value calculating unit 46 calculates and outputs a focus correction value for focusing the lens on a subject.

The contrast evaluation value storage memory 47 stores a plurality of pairs of the combined contrast evaluation value calculated by the contrast evaluation value combining unit 45 for each image sequentially input to the AF signal processing section 7 and the combination ratio thereof in association with positions of the lens 1 at corresponding timings.

Figure 5:
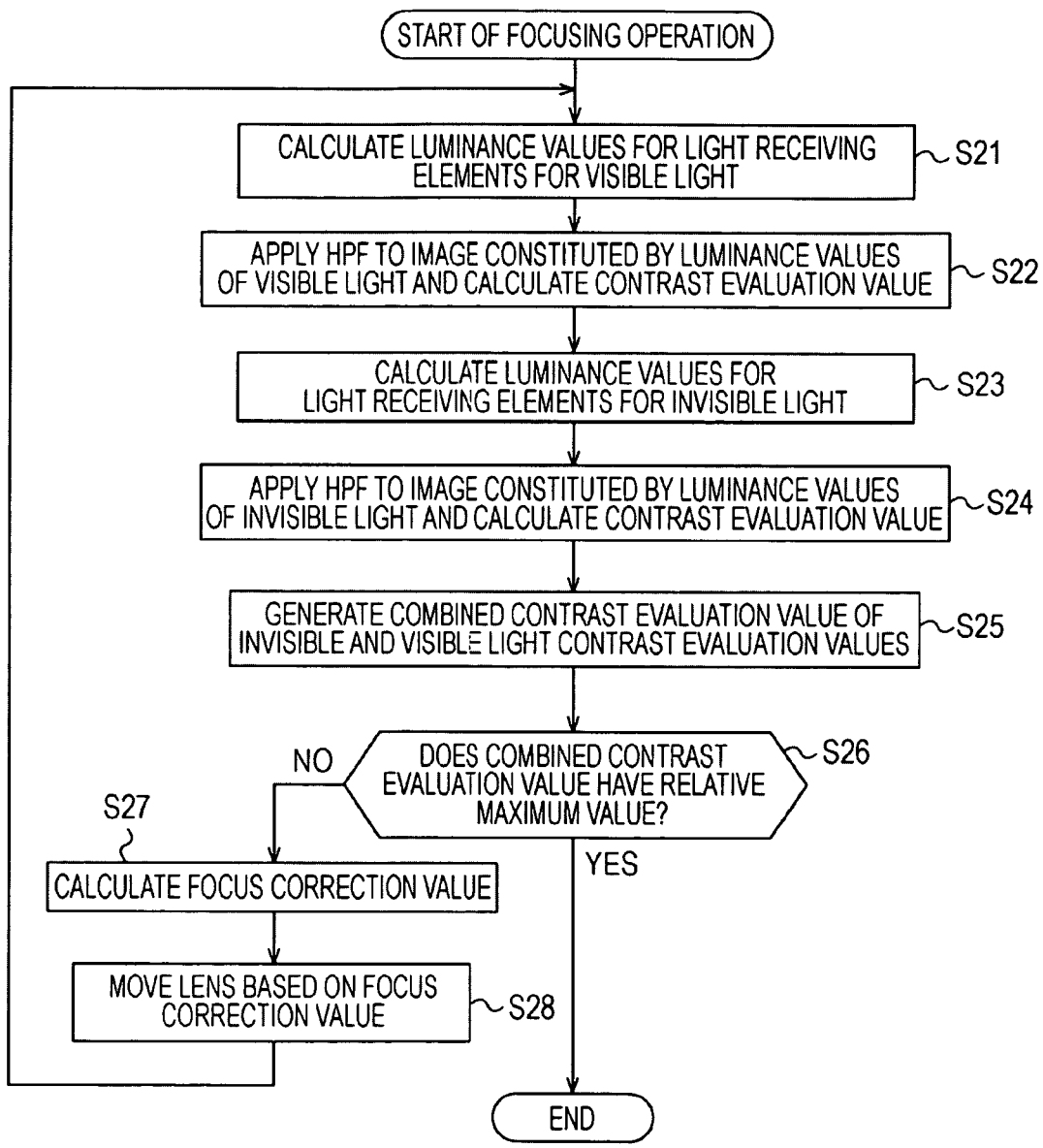
FIG. 5 is a flowchart describing a focusing operation of an AF signal processing section shown in FIG. 4.

A focusing operation performed by the digital still camera shown in FIG. 1 including the AF signal processing section 7 shown in FIG. 4 will now be described with reference to a flowchart shown in FIG. 5.

At STEP S21, the camera signal processing section 6 generates, for each pixel, an image signal including information of visible and invisible light ranges on the basis of image data supplied thereto through the lens 1, the aperture stop 2, the image pickup section 3, the sampling section 4, and the A/D converting section 5. The camera signal processing section 6 supplies the image signals to the AF signal processing section 7. Upon receiving the image signals for one frame, the visible light value calculating unit 41 of the AF signal processing section 7 calculates a luminance value from a value of each pixel for receiving visible light components on the basis of the image signals supplied thereto from the camera signal processing section 6 and outputs the result to the contrast evaluation value calculating unit 42.

At STEP S22, the contrast evaluation value calculating unit 42 applies, for example, a high-pass filter to the luminance value (visible light value) of each pixel of the input luminance image of visible light components to extract high-frequency components as a contrast value. The contrast evaluation value calculating unit 42 integrates the extracted contrast value to calculate a visible light contrast evaluation value and outputs the calculated contrast evaluation value to the contrast evaluation value combining unit 45.

At STEP S23, upon receiving the image signals for one frame, the invisible light value calculating unit 43 of the AF signal processing section 7 calculates a luminance value from a value of each pixel for receiving invisible light components on the basis of the image signals supplied thereto from the camera signal processing section 6 and outputs the result to the contrast evaluation value calculating unit 44.

At STEP S24, the contrast evaluation value calculating unit 44 applies, for example, a high-pass filter to the luminance value (invisible light value) of each pixel of the input luminance image of invisible light components to extract high-frequency components as a contrast value. The contrast evaluation value calculating unit 44 integrates the extracted contrast value to calculate an invisible light contrast evaluation value and outputs the calculated contrast evaluation value to the contrast evaluation value combining unit 45.

At STEP S25, the contrast evaluation value combining unit 45 combines the visible light contrast evaluation value and the invisible light contrast evaluation value at a combination ratio that makes comparison of the contrast evaluation values easier. The contrast evaluation value combining unit 45 outputs the combined contrast evaluation value to the focus correction value calculating unit 46 and the contrast evaluation value storage memory 47 along with the combination ratio.

More specifically, for example, when a visible light contrast evaluation value CE is smaller than an invisible light contrast evaluation value NE, the contrast evaluation value combining unit 45 increases the weight of the invisible light contrast evaluation value and combines the contrast evaluation values. In the opposite case, the contrast evaluation value combining unit 34 increases the weight of the visible light contrast evaluation value and combines the contrast evaluation values. That is, the contrast evaluation value combining unit 45 combines the visible light and invisible light contrast evaluation values to make comparison of the combined contrast evaluation values easier by increasing the weight of the larger contrast evaluation value.

At STEP S26, the focus correction value calculating unit 46 determines whether the combined contrast evaluation values have a relative maximum value on the basis of the combined contrast evaluation value calculated by the contrast evaluation value combining unit 45 regarding the image input at the current time T and the plurality of combined contrast evaluation values calculated before the current time T and stored in the contrast evaluation value storage memory 47.

For example, if the contrast evaluation values are determined not to have a relative maximum value at STEP S26, the focus correction value calculating unit 46 calculates a focus correction value and outputs the correction value to the motor driving section 8 as an AF signal. Since focus positions for visible light and invisible light differ from one another, the focus correction value calculating unit 46 calculates a value for correcting the difference of the focus points of the visible and invisible light on the basis of the combination ratio of the combined contrast evaluation value and reflects the calculated value in the focus correction value.

At STEP S28, the motor driving section 8 drives the motor 9 on the basis of the focus correction value included in the AF signal supplied thereto from the AF signal processing section 7 to move the lens 1. The process then returns to STEP S21.

Processing at STEPs S21 to S28 is repeated until the current combined contrast evaluation value is determined to be a relative maximum value at STEP S26. If the current combined contrast evaluation value is determined to be the relative maximum value, the focusing operation is terminated.

By combining the visible light contrast evaluation value and the invisible light contrast evaluation value while appropriately changing the combination ratio and by comparing the combined contrast evaluation values with each other, highly accurate and robust contrast evaluation can be performed in the above-described operation. In addition, since a focus correction value is determined while taking the combination ratio of the visible light and invisible light contrast evaluation values into account to cope with an issue that focus points for the visible and invisible light differ from one another, the focus can be adjusted to the focus position of the visible light while utilizing the invisible light. As a result, a focusing operation can be performed more accurately than in the related art.

Although an example where the AF signal processing unit 7 shown in FIG. 4 separately calculates the visible light contrast evaluation value and the invisible light contrast evaluation value has been described, the invisible light may be further divided into a plurality of components. For example, a focusing operation similar to that performed by the AF signal processing section 7 of FIG. 4 may be performed using a contrast evaluation value for luminance values of infrared light and a contrast evaluation value for luminance values of ultraviolet light in addition to the visible light contrast evaluation value. In this case, since only the number of kinds of the contrast evaluation values increases, a description regarding the configuration and process is omitted.

An example where visible light and invisible light contrast evaluation values are combined and a focus correction value is determined based on a relative maximum value of the combined contrast evaluation values has been described above. However, a contrast evaluation value having the highest signal-to-noise (S/N) ratio among a plurality of contrast evaluation values may be preferentially used. At this time, auxiliary light may be irradiated using the light irradiating section 19.

FIG. 6 shows an example of a configuration of an AF signal processing section 7 according to an embodiment of the present invention. The AF signal processing section 7 preferentially uses a contrast evaluation value having the highest S/N ratio among a plurality of contrast evaluation values and also uses auxiliary light if necessary.

A visible light value calculating unit 51 calculates, as a visible light value, a visible light luminance value from each pixel value using information of captured wavelengths in the visible light range. The visible light value calculating unit 51 outputs the result to a contrast evaluation value calculating unit 52.

The contrast evaluation value calculating unit 52 applies, for example, a high-pass filter to the visible light value of each pixel of the input luminance image to extract high-frequency components as a contrast value. The contrast evaluation value calculating unit 52 integrates the extracted contrast value to calculate a contrast evaluation value for the visible light values (hereinafter, referred to as visible light contrast evaluation value). Additionally, the contrast evaluation value calculating unit 52 includes an S/N ratio calculator 52a and controls the S/N ratio calculator 52a to calculate an S/N ratio of the visible light contrast evaluation value. The contrast evaluation value calculating unit 52 outputs the calculated visible light contrast evaluation value and the S/N ratio to a focus correction value calculating unit 55, a contrast evaluation value storage memory 56, and a light-irradiating-section control signal generating unit 57.

An invisible light value calculating unit 53 calculates, as an invisible light value, an invisible light luminance value from each pixel value using information of captured wavelengths in the invisible light range. The invisible light value calculating unit 53 outputs the result to a contrast evaluation value calculating unit 54.

The contrast evaluation value calculating unit 54 applies, for example, a high-pass filter to the invisible light value of each pixel of the input luminance image to extract high-frequency components as a contrast value. The contrast evaluation value calculating unit 54 integrates the extracted contrast value to calculate a contrast evaluation value for the invisible light values (hereinafter, referred to as invisible light contrast evaluation value). Additionally, the contrast evaluation value calculating unit 54 includes an S/N ratio calculator 54a and controls the S/N ratio calculator 54a to calculate an S/N ratio of the invisible light contrast evaluation value. The contrast evaluation value calculating unit 54 outputs the calculated invisible light contrast evaluation value and the S/N ratio to the focus correction value calculating unit 55, the contrast evaluation value storage memory 56, and the light-irradiating-section control signal generating unit 57.

The focus correction value calculating unit 55 includes an S/N ratio comparator 55a. The S/N ratio comparator 55a compares the S/N ratios of the contrast evaluation values calculated by the contrast evaluation calculating units 52 and 54 regarding an image input at a current time T and selects the contrast evaluation value having the higher S/N ratio. The focus correction value calculating unit 55 estimates a focus position that gives a relative maximum value of the contrast evaluation values on the basis of the contrast evaluation value having the higher S/N ratio that is selected by the S/N ratio comparator 55a and a plurality of contrast evaluation values calculated for each image before the current time T and stored in the contrast evaluation value storage memory 56. The focus correction value calculating unit 55 calculates and outputs a focus correction value for focusing the lens on a subject.

The contrast evaluation value storage memory 56 stores a plurality of pairs of the contrast evaluation values and the S/N ratios calculated by the contrast evaluation value calculating units 52 and 54 regarding each image sequentially input to the AF signal processing section 7.

When the S/N ratio is lower than a predetermined threshold, the light-irradiating-section control signal generating unit 57 selects a wavelength of auxiliary light suitable for determination of the contrast evaluation value on the basis of the S/N ratio of each of the visible light and invisible light contrast evaluation values supplied to the focus correction value calculating unit 55 and stored in the contrast evaluation value storage memory 56. The light-irradiating-section control signal generating unit 57 controls the light irradiating section 19 to emit light.

Figure 7:
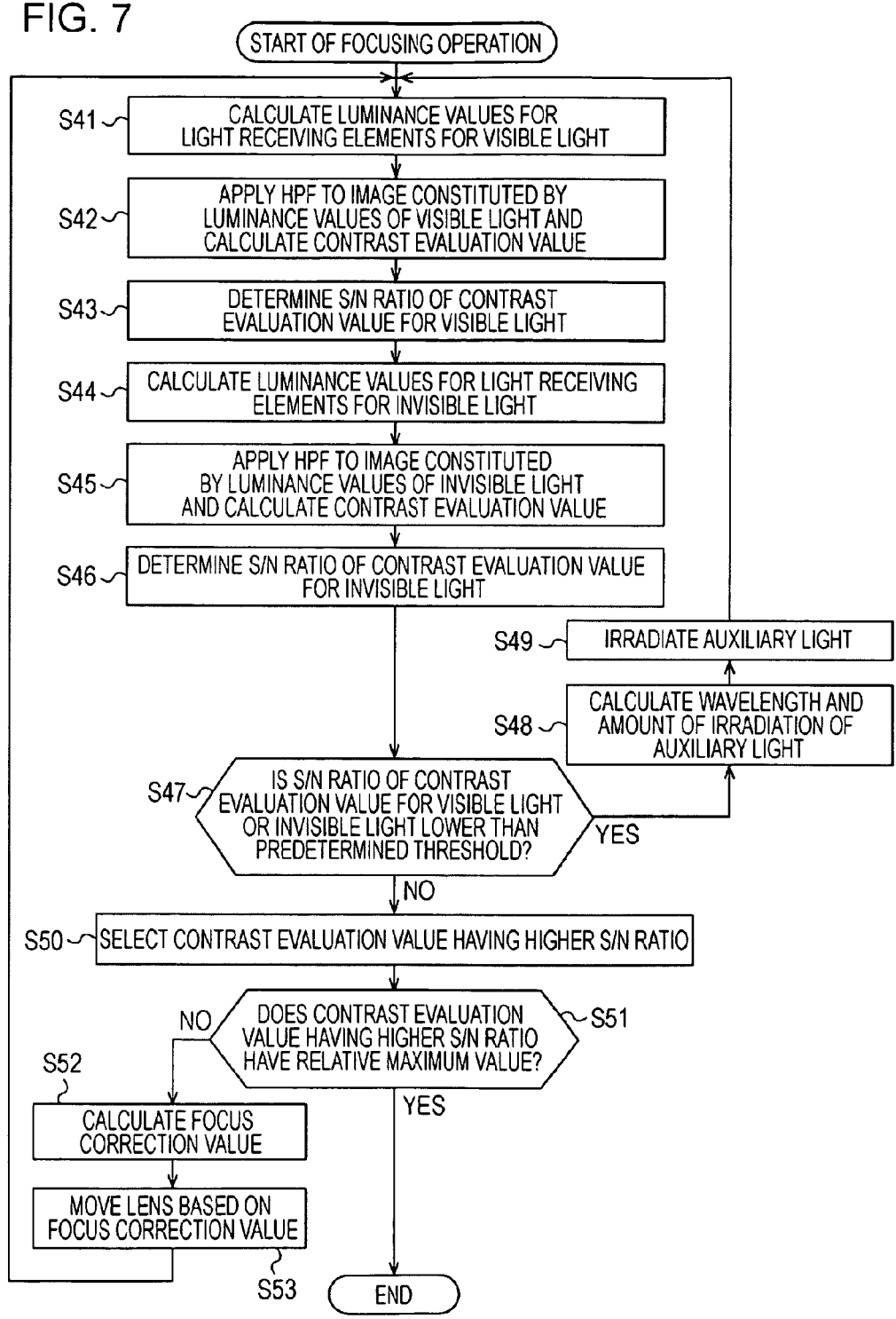
FIG. 7 is a flowchart describing a focusing operation of an AF signal processing section shown in FIG. 6.

A focusing operation performed by the digital still camera shown in FIG. 1 including the AF signal processing section 7 shown in FIG. 6 will now be described with reference to a flowchart shown in FIG. 7.

At STEP S41, the camera signal processing section 6 generates, for each pixel, an image signal including information of visible and invisible light ranges on the basis of image data supplied thereto through the lens 1, the aperture stop 2, the image pickup section 3, the sampling section 4, and the A/D converting section 5. The camera signal processing section 6 supplies the image signals to the AF signal processing section 7. Upon receiving the image signals for one frame, the visible light value calculating unit 51 of the AF signal processing section 7 calculates a luminance value from a pixel value of each pixel for receiving visible light components on the basis of the image signals supplied thereto from the camera signal processing section 6 and outputs the result to the contrast evaluation value calculating unit 52.

At STEP S42, the contrast evaluation value calculating unit 52 applies, for example, a high-pass filter to the luminance value (visible light value) of each pixel of the input luminance image of visible light components to extract high-frequency components as a contrast value. The contrast evaluation value calculating unit 52 integrates the extracted contrast value to calculate a visible light contrast evaluation value.

At STEP S43, the contrast evaluation value calculating unit 52 controls the S/N ratio calculator 52a to calculate an S/N ratio on the basis of the visible light contrast evaluation value. The contrast evaluation value calculating unit 52 outputs the visible light contrast evaluation value to the focus correction value calculating unit 55, the contrast evaluation value storage memory 56, and the light-irradiating-section control signal generating unit 57 along with the calculated S/N ratio.

At STEP S44, upon receiving the image signals for one frame, the invisible light value calculating unit 53 of the AF signal processing section 7 calculates a luminance value from a pixel value of each pixel for receiving invisible light components on the basis of the image signals supplied thereto from the camera signal processing section 6 and outputs the result to the contrast evaluation value calculating unit 54.

At STEP S45, the contrast evaluation value calculating unit 54 applies, for example, a high-pass filter to the luminance value (invisible light value) of each pixel of the input luminance image of invisible light components to extract high-frequency components as a contrast value. The contrast evaluation value calculating unit 54 integrates the extracted contrast value to calculate an invisible light contrast evaluation value.

At STEP S46, the contrast evaluation value calculating unit 54 controls the S/N ratio calculator 54a to calculate an S/N ratio on the basis of the invisible light contrast evaluation value. The contrast evaluation value calculating unit 54 outputs the invisible light contrast evaluation value to the focus correction value calculating unit 55, the contrast evaluation value storage memory 56, and the light-irradiating-section control signal generating unit 57 along with the calculated S/N ratio.

At STEP S47, the light-irradiating-section control signal generating unit 57 determines whether the S/N ratio is lower than a predetermined threshold on the basis of the S/N ratios of the visible light and invisible light contrast evaluation values supplied to the focus correction value calculating unit 55 and stored in the contrast evaluation value storage memory 56. For example, if the S/N ratio is lower than the threshold, the light-irradiating-section control signal generating unit 57 calculates a wavelength, an illumination level, and an irradiation period of auxiliary light suitable for determination of contrast evaluation values and outputs a light-irradiating-section control signal to the light irradiating section 19 at STEP S48. At this time, when the S/N ratio of the visible light contrast evaluation value is unpreferable, a visible-light-weighed wavelength is selected as the wavelength of the auxiliary light. Conversely, when the S/N ratio of the invisible light contrast evaluation value is unpreferable, an invisible-light-weighed wavelength is selected.

At STEP S49, the light irradiating section 19 irradiates auxiliary light on the basis of the light-irradiating-section control signal. The process then returns to STEP S41.

Accordingly, processing at STEPs S41 to S49 is repeated until the S/N ratio is improved.

If the S/N ratio is improved by the auxiliary light irradiated by the light irradiating section 19 and is determined to not to be lower than the predetermined threshold at STEP S47, the focus correction value calculating unit 55 controls the S/N ratio comparator 55a to select the contrast evaluation value having the higher S/N ratio from the visible light and invisible light contrast evaluation values at STEP S50.

At STEP S51, the focus correction value calculating unit 55 determines whether the contrast evaluation values have a relative maximum value on the basis of the contrast evaluation value having the higher S/N ratio of the image input at the current time T and the plurality of contrast evaluation values calculated for each image before the current time T and stored in the contrast evaluation value storage memory 56.

For example, if the contrast evaluation values are determined not to have the relative maximum value at STEP S51, the focus correction value calculating unit 55 calculates a focus correction value and outputs the correction value to the motor driving section 8 as an AF signal at STEP S52.

At STEP S53, the motor driving section 8 drives the motor 9 on the basis of the focus correction value included in the AF signal supplied thereto from the AF signal processing section 7 to move the lens 1. The process then returns to STEP S41.

Processing at STEPs S41 to S53 is repeated until the current contrast evaluation value is determined to be the relative maximum value at STEP S51. If the current contrast evaluation value is determined to be the relative maximum value, the focusing operation is terminated.

In a focus detection method employed in the related art, calculation of a highly accurate contrast value is difficult when images are captured under a low-illumination environment, for example. However, the above-described operation allows the highly accurate contrast value to be calculated utilizing an infrared light range, which is an invisible light range. In addition, the utilization of an ultraviolet light range, which is an invisible light range, allows contrast that cannot be obtained in the visible light range to be possibly obtained. For example, ultraviolet image capturing is used in an inspection of faint scratches, which are not seen under the visible light, formed on a surface of an object. As shown by images on the left side of FIG. 8 (an upper image is a captured image and a lower image is an image obtained by applying a HPF to the captured image), featureless petals are shown in an image captured under visible light. As shown by images on the right side of FIG. 8 (an upper image is a captured image and a lower image is an image obtained by applying a HPF to the captured image), patterns appear on the petals in an image captured under ultraviolet light. Accordingly, even when calculation of a contrast value is difficult under the visible light, calculation of the contrast value can be performed more stably utilizing the invisible light as well as the visible light.

In an image capturing apparatus, such as a digital still camera or a video camera, according to the related art, the accuracy of focus detection of an auto focus function that utilizes a result captured under visible light undesirably decreases when the contrast of a subject is low or the environment illumination level is low. However, according to the embodiment, the focus can be detected highly accurately and robustly by utilizing invisible light as well as visible light in the focus detection when the contrast of a subject is low.

In addition, since a wavelength and an illumination level of auxiliary light suitable for contrast evaluation are estimated based on calculated visible light and invisible light contrast evaluation values and the auxiliary light is irradiated onto a subject by a light irradiating section, the focus can be detected more accurately and robustly than in the related art.

When invisible light is utilized in focus detection and actual image capturing is carried out under visible light, a captured result may undesirably go out of focus since focus positions of visible light and invisible light differ from one another. However, according to the embodiment, this issue can be solved by determining a correction value for a difference between the focus positions of the visible and invisible light in the focus correction operation when the invisible light is utilized in the focus detection.

Although an example where the embodiments of the present invention are applied to a digital still camera has been described above, the embodiments can be applied to other image capturing apparatuses having an auto focus function. For example, the embodiments can be applied to a video camera.

As described above, according to the embodiments of the present invention, a focusing operation can be performed highly accurately and robustly even on a low-contrast subject.

Meanwhile, the above-described series of image processing steps can be executed by hardware or software. When the series of steps is executed by software, programs constituting the software may be installed, from a recording medium having the programs recorded thereon, in a computer embedded in a dedicated hardware or, for example, a general-purpose computer capable of performing various functions by installing various programs.

FIG. 9 shows an example of a configuration of a general-purpose personal computer (PC). The PC includes a central processing unit (CPU) 1001 therein. The CPU 1001 is connected to an input/output (I/O) interface 1005 through a bus 1004. A read only memory (ROM) 1002 and a random access memory (RAM) 1003 are also connected to the bus 1004.

An input unit 1006, an output unit 1007, a storage unit 1008, and a communication unit 1009 are connected to the I/O interface 1005. The input unit 1006 includes input devices, such as a keyboard and a mouse, through which users enter operation commands. The output unit 1007 outputs images of operation screens and processing results on a display device. A storage unit 1008 includes a hard disc drive (HDD) for storing programs and various data. The communication unit 1009 includes a local area network (LAN) adaptor and executes communication processing through a network, such as the Internet. In addition, a drive 1010 for writing and reading data on and from a removable medium 1011, such as a magnetic disc (including a flexible disc), an optical disc (including a CD-ROM (compact disc-read only memory) or a DVD (digital versatile disc)), a magneto-optical disc (including an MD (mini disc)), or a semiconductor memory, is also connected to the I/O interface 1005.

The CPU 1001 executes various kinds of processing according to programs stored in the ROM 1002 or programs read out from the removable medium 1011, such as a magnetic disc, an optical disc, a magneto-optical disc, or a semiconductor memory, installed in the storage unit 1008, and loaded into the RAM 1003 from the storage unit 1008. The RAM 1003 also stores data necessary for the CPU 1001 to execute various kinds of processing if necessary.

In this specification, the steps described in a program recorded on a recording medium include processing that is executed sequentially in the described order, and also includes processing that is executed in parallel or individually, not necessarily sequentially.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
image pickup means including an image pickup element configured to capture, in a unit of pixels, a plurality of colors in ranges of visible and invisible light incoming through an image capturing lens;
pixel value calculating means configured to calculate a pixel value of each pixel regarding at least one of the colors captured by the image pickup means;
contrast value calculating means configured to calculate a contrast value for each of the at least one color on the basis of the pixel values calculated by the pixel value calculating means;
contrast value storage memory means configured to store a plurality of contrast values;
focus correction value calculating means configured to determine whether the contrast values have a relative maximum value and calculate a focus correction value for a distance from a current position of the image capturing lens to a focus position of the image capturing lens on the basis of a temporal change in the contrast values of the at least one color calculated by the contrast value calculating means; and
image capturing lens driving means configured to drive the image capturing lens on the basis of the focus correction value calculated by the focus correction value calculating means;
wherein the pixel value calculating means calculates, for each pixel, a luminance value, including the visible light and the invisible light, as a pixel value;
wherein the contrast value calculating means calculates the contrast value by applying a high-pass filter to the luminance value of each pixel calculated by the pixel value calculating means;
wherein when the focus correction value calculating means determines that the contrast values do not have a relative maximum value, the focus correction value calculating means calculates the focus correction value for the distance from the current position of the image capturing lens to the focus position of the image capturing lens on the basis of the temporal change in the contrast values calculated by the contrast value calculating means;
wherein the focus correction value calculating means determines whether the contrast values have a relative maximum value on the basis of a contrast value calculated for incoming colors at a current time, a plurality of contrast values calculated for incoming colors before the current time and stored in the contrast value storage memory means, and a corresponding position of the image capturing lens;
wherein at least three contrast values are needed for the contrast values to have a relative maximum value; and
wherein when two or more contrast values exist and the focus correction value calculating means determines that the contrast values do not have a relative maximum value, the focus calculating means sets, as the focus correction value, a distance between the current position of the image capturing lens and a position away from the current position of the image capturing lens corresponding to a maximum value of the plurality of the contrast values calculated before the current time by a predetermined distance in a direction from the current position of image capturing lens toward the position corresponding to the maximum value.

2. The apparatus according to claim 1, wherein
the pixel value calculating means includes
visible light value calculating means configured to calculate, for each pixel, a luminance value of visible light as a visible light value, and
invisible light value calculating means configured to calculate, for each pixel, a luminance value of invisible light as an invisible light value, and
wherein the contrast value calculating means includes
visible light contrast calculating means configured to calculate a visible light contrast value regarding the visible light values calculated by the visible light value calculating means, and
invisible light contrast calculating means configured to calculate an invisible light contrast value regarding the invisible light values calculated by the invisible light value calculating means, and wherein the focus correction value calculating means calculates the focus correction value for the distance from the current position of the image capturing lens to the focus position of the image capturing lens on the basis of the temporal change in the visible light contrast values and the invisible light contrast values.

3. The apparatus according to claim 2, further comprising:
visible light S/N ratio calculating means configured to calculate an S/N ratio of the visible light contrast value calculated by the visible light contrast value calculating means; and
invisible light S/N ratio calculating means configured to calculate an S/N ratio of the invisible light contrast value calculated by the invisible light contrast value calculating means, wherein
the focus correction value calculating means compares the S/N ratio of the visible light contrast value with the S/N ratio of the invisible light contrast value, selects the contrast value having a larger S/N ratio as a contrast value suitable for calculation of the focus correction value, and calculates the focus correction value for the distance from the current position of the image capturing lens to the focus position of the image capturing lens on the basis of a temporal change in the contrast values suitable for calculation of the focus correction value.

4. The apparatus according to claim 2, further comprising:
contrast value combining means configured to combine the visible light contrast value and the invisible light contrast value to generate a combined contrast value, wherein
the focus correction value calculating means calculates the focus correction value for the distance from the current position of the image capturing lens to the focus position of the image capturing lens on the basis of a temporal change in the combined contrast values.

5. The apparatus according to claim 4, wherein the contrast value combining means combines the visible light contrast value and the invisible light contrast value at a combination ratio based on both of the contrast values to generate the combined contrast value, and
wherein the focus correction value calculating means calculates, according to the combination ratio, the focus correction value for the distance from the current position of the image capturing lens to the focus position of the image capturing lens on the basis of the temporal change in the combined contrast values.

6. The apparatus according to claim 1, further comprising:
auxiliary light irradiating means configured to irradiate light of a color, in the visible and invisible light ranges, suitable for calculation of the contrast value onto a subject; and auxiliary light irradiation control means configured to control irradiation of auxiliary light performed by the auxiliary light irradiating means.

7. The apparatus according to claim 6, wherein the auxiliary light irradiation control means controls the auxiliary light irradiating means to irradiate light, selected from the visible light, the infrared light, and the ultraviolet light, suitable for calculation of the contrast value onto a subject.

8. An image capturing method comprising the steps of:
capturing, in a unit of pixels, a plurality of colors in ranges of visible and invisible light incoming through an image capturing lens;
calculating a pixel value of each pixel regarding at least one of the captured colors;
calculating, for each of the at least one color, a contrast value on the basis of the calculated pixel values of the corresponding color;
storing a plurality of contrast values;
determining whether the contrast values have a relative maximum value; and
calculating a focus correction value for a distance from a current position of the image capturing lens to a focus position of the image capturing lens on the basis of a temporal change in the calculated contrast values of the at least one color; and
driving the image capturing lens on the basis of the calculated focus correction value;
wherein calculating a pixel value includes calculating, for each pixel, a luminance value, including the visible light and the invisible light, as a pixel value;
wherein calculating a contrast value includes calculating the contrast value by applying a high-pass filter to the luminance value of each pixel;
wherein when the determination is made that the contrast values do not have a relative maximum value, calculating the focus correction value for the distance from the current position of the image capturing lens to the focus position of the image capturing lens on the basis of the temporal change in the contrast;
wherein determining whether the contrast values have a relative maximum value is based on a contrast value calculated for incoming colors at a current time, a plurality of contrast values calculated for incoming colors stored before the current time, and a corresponding position of the image capturing lens;
wherein at least three contrast values are needed for the contrast values to have a relative maximum value; and
wherein when two or more contrast values exist and the contrast values do not have a relative maximum setting, as the focus correction value, a distance , between the current position of the image capturing lens and a position away from the current position of the image capturing lens corresponding to a maximum value of the plurality of contrast values , calculated before the current time by a predetermined distance in a direction from the current position of image capturing lens toward the position corresponding to the maximum value.

9. A non-transitory program-storing medium having a program stored thereon, the program allowing a computer to execute a method, the method comprising the steps of:
capturing, in a unit of pixels, a plurality of colors in ranges of visible and invisible light incoming through an image capturing lens;
calculating a pixel value of each pixel regarding at least one of the captured colors;
calculating, for each of the at least one color, a contrast value on the basis of the calculated pixel values of the corresponding color;
storing a plurality of contrast values;
determining whether the contrast values have a relative maximum value; and
calculating a focus correction value for a distance from a current position of the image capturing lens to a focus position of the image capturing lens on the basis of a temporal change in the calculated contrast values of the at least one color; and
driving the image capturing lens on the basis of the calculated focus correction value;
wherein calculating a pixel value includes calculating, for each pixel, a luminance value, including the visible light and the invisible light, as a pixel value;
wherein calculating a contrast value includes calculating the contrast value by applying a high-pass filter to the luminance value of each pixel:
wherein when the determination is made that the contrast values do not have a relative maximum value, calculating the focus correction value for the distance from the current position of the image capturing lens to the focus position of the image capturing lens on the basis of the temporal change in the contrast values;
wherein determining whether the contrast values have a relative maximum value is based on a contrast value calculated for incoming colors at a current time, a plurality of contrast values calculated for incoming colors stored before the current time, and a corresponding position of the image capturing lens;
wherein at least three contrast values are needed for the contrast values to have a relative maximum value; and
wherein when two or more contrast values exist and the contrast values do not have a relative maximum value, setting, as the focus correction value, a distance between the current position of the image capturing lens and a position away of the current position of the image corresponding to a maximum value of the plurality of contrast values calculated before the current time by a predetermined distance in a direction from the current position of capturing lens toward the position corresponding to the maximum value.

10. An image capturing apparatus comprising:
an image pickup unit including an image pickup element configured to capture, in a unit of pixels, a plurality of colors in ranges of visible and invisible light incoming through an image capturing lens;
a pixel value calculating unit configured to calculate a pixel value of each pixel regarding at least one of the colors captured by the image pickup unit;
a contrast value calculating unit configured to calculate a contrast value for each of the at least one color on the basis of the pixel values calculated by the pixel value calculating unit;
contrast value storage memory unit configured to store a plurality of contrast values;
a focus correction value calculating unit configured to determine whether the contrast values have a relative maximum value and calculate a focus correction value for a distance from a current position of the image capturing lens to a focus position of the image capturing lens on the basis of a temporal change in the contrast values of the at least one color calculated by the contrast value calculating unit; and an image capturing lens driving unit configured to drive the image capturing lens on the basis of the focus correction value calculated by the focus correction value calculating unit;

wherein the pixel value calculating unit calculates, for each pixel, a luminance value, including the visible light and the invisible light, as a pixel value;

wherein the contrast value calculating unit calculates the contrast value by applying a high-pass filter to the luminance value of each pixel calculated by the pixel value calculating unit;

wherein when the focus correction value calculating unit determines that the contrast values do not have a relative maximum value, the focus correction value calculating unit calculates the focus correction value for the distance from the current position of the image capturing lens to the focus position of the image capturing lens on the basis of the temporal change in the contrast values calculated by the contrast value calculating unit;

wherein the focus correction value calculating unit determines whether the contrast values have a relative maximum value on the basis of a contrast value calculated for incoming colors at a current time, a plurality of contrast values calculated for incoming colors before the current time and stored in the contrast value storage memory unit, and a corresponding position of the image capturing lens;

wherein at least three contrast values are needed for the contrast values to have a relative maximum value, wherein when two or more contrast values exist and the focus correction value calculating means determines that the contrast values do not have a relative maximum value, the focus correction value calculating means sets, as the focus correction value, a distance between the current position of the image capturing lens and a position away from the current position of the image capturing lens corresponding to a maximum value of the plurality of contrast values calculated before the current time by a predetermined distance in a direction from the current position of image lens toward the position corresponding to the maximum value.

11. An image capturing apparatus comprising:

image pickup means including an image pickup element configured to capture, in a unit of pixels, a plurality of colors in ranges of visible and invisible light incoming through an image capturing lens;

pixel value calculating means configured to calculate a pixel value of each pixel regarding at least one of the colors captured by the image pickup means;

contrast value calculating means configured to calculate a contrast value for each of the at least one color on the basis of the pixel values calculated by the pixel value calculating means;

contrast value storage memory means configured to store a plurality of contrast values;

focus correction value calculating means configured to determine whether the contrast values have a relative maximum value and calculate a focus correction value for a distance from a current position of the image capturing lens to a focus position of the image capturing lens on the basis of a temporal change in the contrast values of the at least one color calculated by the contrast value calculating means; and image capturing lens driving means configured to drive the image capturing lens on the basis of the focus correction value calculated by the focus correction value calculating means;

wherein the pixel value calculating means calculates, for each pixel, a luminance value of infrared light and a luminance value of ultraviolet light as an infrared light value and an ultraviolet light value, respectively;

wherein the contrast value calculating means calculates a contrast value by applying a high-pass filter to each of the visible light values, the infrared light values, and the ultraviolet light values calculated by the pixel value calculating means;

wherein when the focus correction value calculating means determines that the contrast values do not have a relative maximum value, the focus correction value calculating means calculates the focus correction value for the distance from the current position of the image capturing lens to the focus position of the image capturing lens on the basis of temporal changes in the contrast values of the visible light values, the infrared light values, and the ultraviolet light values calculated by the contrast value calculating means;

wherein the focus correction value calculating means determines whether the contrast values have a relative maximum value on the basis of a contrast value calculated for incoming colors at a current time, a plurality of contrast values calculated for incoming colors before the current time and stored in the contrast value storage memory means, and a corresponding position of the image capturing lens;

wherein at least three contrast values are needed for the contrast values to have a relative maximum value; and wherein when two or more contrast values exist and the focus correction value calculating means determines that the contrast values do not have a relative maximum value, the focus correction value calculating means sets, as the focus correction value, a distance between the current position of the image capturing lens and a position away from the current position of the image capturing lens corresponding to a maximum value of the plurality of contrast values calculated before the current time by a predetermined distance in a direction from the current position of image capturing lens toward the position corresponding to the maximum value.

12. The apparatus according to claim 1, wherein when the at least three contrast values exist and the relative maximum contrast value exists when the position of the image capturing lens is located near a middle of a position nearest to an aperture stop and farthest from an aperture stop, the focus correction value calculating means determines a position of the image capturing lens that gives the relative maximum contrast value via interpolation using the contrast value corresponding to the middle position of the image capturing lens and calculates a difference between the middle position and a current position as the focus correction value.

* * * * *